Figure 1:
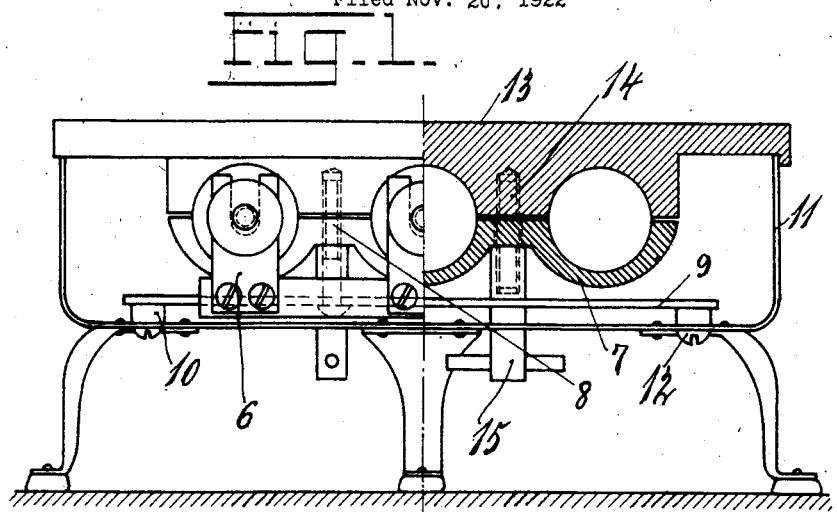

Jan. 1, 1924

O. A. JOHANSEN

ELECTRIC HEATING APPARATUS

Filed Nov. 20, 1922

1,479,139

Inventor
Ole Anton Johansen
By
Pennie, Davis, Marvin & Edmonds
Attorneys

Patented Jan. 1, 1924.

1,479,139

UNITED STATES PATENT OFFICE.

OLE ANTON JOHANSEN, OF CHRISTIANIA, NORWAY.

ELECTRIC HEATING APPARATUS.

Application filed November 20, 1922. Serial No. 601,953.

*To all whom it may concern:*

Be it known that I, OLE ANTON JOHANSEN, a subject of the King of Norway, residing at Christiania, Norway, have invented certain new and useful Improvements in Electric Heating Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object an electric heating apparatus (cooking plate, heating furnace, iron or the like) of the kind comprising a heat accumulating or transmitting body in combination with heating elements transmitting their heat to said body.

In accordance with the present invention the heating bodies or elements are interchangeably mounted in the heat accumulating or transmitting body in channels the cross sections of which correspond so accurately to the cross section of the interchangeable heating elements, that the latter owing to the expansion when heated are brought into good contact with the inside surface of the channels so as to produce a good transmission of heat to the heat accumulating body.

In cold condition however the heating elements may easily be taken out of their channels.

Figure 2:
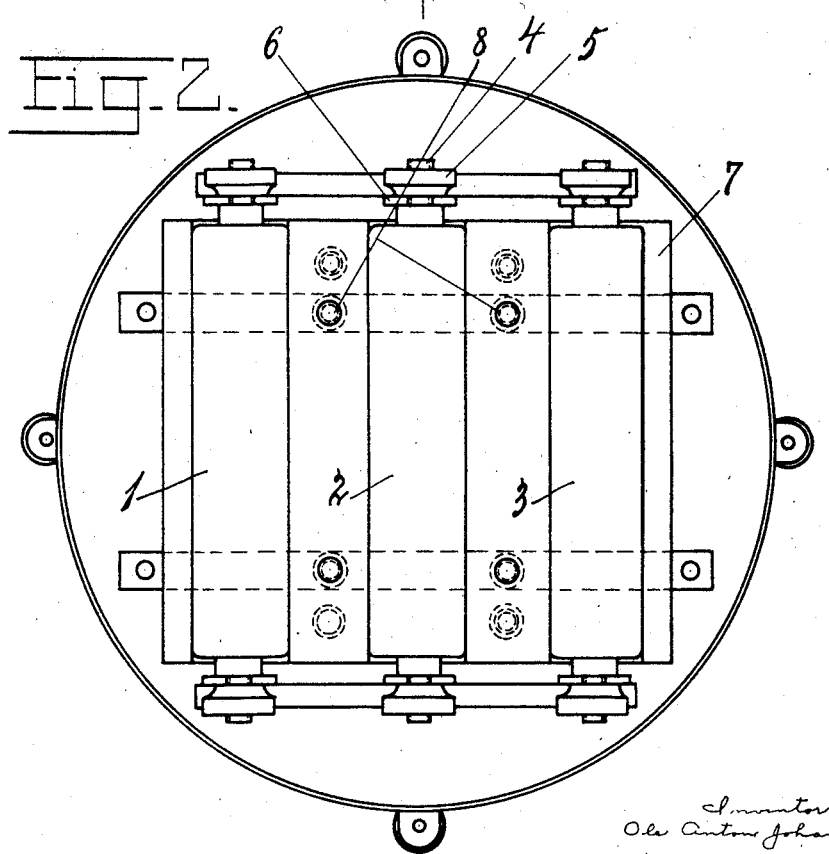

On the drawing a form of the invention is illustrated:

Fig. 1 is a sectional side view, and
Fig. 2 a plan of the apparatus.

1, 2, 3 are the heating elements, 4 are the contact screws for the same and 5 the nuts for fastening the electric connections.

The heat accumulating body according to the form of the invention illustrated is divided in two parts 7, 13 on a plane which goes through the axes of the heating elements 1, 2, 3.

The lower part 7 of the heat accumulating body is fastened by means of screws 8 to resilient supporting beams 9, which are again connected to the frames of the cooking plate by means of screws 12 and sleeves 10.

The upper part 13 of the heat accumulating body forms the cooking plate and is connected with the lower part 7 by means of screws 14 and sleeve nuts 15.

The heating elements, as will be seen, have their ends projecting outside the heat accumulating body at opposite sides thereof.

Preferably the several heating elements 1, 2, 3 at one side are all permanently connected with one electric conduit, while the connections at the opposite ends may be interrupted or closed independently so as to obtain a regulation of the heat supplied.

In order to give good heat transmitting contact the heating elements are preferably provided with a shell of iron, copper or other material having a good heat conductive capacity.

Although the heat accumulating body in the form of the invention illustrated is shown divided in two parts, it may also be made in one part with channels formed therein, and the invention is not limited to the specific construction illustrated.

Also it is obvious that it is not absolutely necessary to make the channels and heating elements with circular cross section, as the cross section may also be given a square or any other suitable form.

Claims.

1. In an electric heating apparatus, a heat accumulating or transmitting body, channels open at both ends through said body and interchangeable heating elements fitting into said channels, said heating elements having means at one end for connection to one electric supply conduit, and means at the opposite end for connection to the other electric supply conduit.

2. In an electric heating apparatus, a heat accumulating or transmitting body, channels open at both ends through said body and interchangeable heating elements with contact terminals at opposite ends fitting into said channels, said heat accumulating body being divided in two separate parts on a plane passing through the axes of said channels.

In testimony that I claim the foregoing as my invention, I have signed my name in presence of two subscribing witnesses.

OLE ANTON JOHANSEN.

Witnesses:
  MOGENS BRIGG,
  HENRY MUHRMAN.